(12) United States Patent
Mouri et al.

(10) Patent No.: US 10,246,002 B2
(45) Date of Patent: Apr. 2, 2019

(54) LIGHTING DEVICE FOR VEHICLE

(71) Applicants: TOYOTA JIDOSHA KABUSHIKI KAISHA, Toyota-shi, Aichi-ken (JP); KOITO MANUFACTURING CO., LTD., Tokyo (JP)

(72) Inventors: Fumihiko Mouri, Owariasahi (JP); Susumu Yamamoto, Shizuoka (JP); Satoshi Yamamura, Shizuoka (JP)

(73) Assignees: TOYOTA JIDOSHA KABUSHIKI KAISHA, Toyota (JP); KOITO MANUFACTURING CO., LTD., Tokyo (JP)

( * ) Notice: Subject to any disclaimer, the term of this patent is extended or adjusted under 35 U.S.C. 154(b) by 5 days.

(21) Appl. No.: 15/819,505

(22) Filed: Nov. 21, 2017

(65) Prior Publication Data
US 2018/0162264 A1    Jun. 14, 2018

(30) Foreign Application Priority Data
Dec. 14, 2016  (JP) ................. 2016-242493

(51) Int. Cl.
*B60Q 1/08* (2006.01)
*B60Q 1/18* (2006.01)
*F21S 41/43* (2018.01)
*F21V 11/08* (2006.01)
*F21V 23/04* (2006.01)
*F21S 41/143* (2018.01)
(Continued)

(52) U.S. Cl.
CPC ............ *B60Q 1/085* (2013.01); *B60Q 1/18* (2013.01); *F21S 41/143* (2018.01); *F21S 41/153* (2018.01); *F21S 41/255* (2018.01); *F21S 41/43* (2018.01); *F21S 41/663* (2018.01); *F21V 11/08* (2013.01); *F21V 23/0471* (2013.01); *B60Q 2300/45* (2013.01)

(58) Field of Classification Search
None
See application file for complete search history.

(56) References Cited

U.S. PATENT DOCUMENTS

| 2013/0038736 | A1  | 2/2013  | Yamamura |
| 2016/0332568 | A1* | 11/2016 | Kim ................... B60Q 1/50 |
| 2017/0101056 | A1* | 4/2017  | Park .................. B60Q 9/008 |

FOREIGN PATENT DOCUMENTS

| JP | 2014-175359 A | 9/2014 |
| JP | 2015-026628 A | 2/2015 |
| JP | 2015-044586 A | 3/2015 |

OTHER PUBLICATIONS

U.S. Appl. No. 15/714,180, filed Sep. 25, 2017 in the name of Mouri et al.

* cited by examiner

*Primary Examiner* — Kristy A Haupt
(74) *Attorney, Agent, or Firm* — Oliff PLC

(57) ABSTRACT

A lighting device for a vehicle includes an irradiator that includes a light source mounted in the vehicle, and a shield that is provided to face an emission side of band-shaped light from the light source. The irradiator is configured to emit the band-shaped light from the light source at a predetermined irradiation angle to irradiate a road surface with the band-shaped light, and the irradiator is configured to change an irradiation direction of the band-shaped light toward the road surface. The shield is configured to shield a part of the band-shaped light such that the road surface is illuminated in a shape of a figure indicating prescribed information.

6 Claims, 13 Drawing Sheets

(51) Int. Cl.
*F21S 41/153* (2018.01)
*F21S 41/255* (2018.01)
*F21S 41/663* (2018.01)

CELL 23C-1

SLIT (EMISSION HOLE)

23C-1

FR
FH

LIGHTING DEVICE FOR VEHICLE

INCORPORATION BY REFERENCE

The disclosure of Japanese Patent Application No. 2016-242493 filed on Dec. 14, 2016 including the specification, drawings and abstract is incorporated herein by reference in its entirety.

BACKGROUND

1. Technical Field

The present disclosure relates to a lighting device for a vehicle that is mounted in the vehicle to perform light irradiation.

2. Description of Related Art

In Japanese Unexamined Patent Application Publication No. 2014-175359 (JP 2014-175359 A), a lighting fixture for a vehicle that includes a light emitting device with an LED chip mounted therein and irradiates a road surface with light emitted from the light emitting device through a projection lens has been suggested. In the lighting fixture for a vehicle, a shade that cuts a part of light and forms a cutline in light for irradiating the road surface is provided on an emission side of light emitted from the light emitting device.

SUMMARY

The road surface is irradiated with light from the vehicle, whereby it is possible to give notification of information for attracting attention of a person, such as a pedestrian. Meanwhile, in the cutline that is formed by the shade, irradiation of a comparatively wide region with light is possible; however, it is insufficient to give notification of information using light with which the road surface is irradiated.

The present disclosure provides a lighting device for a vehicle capable of irradiating a smaller region with light to draw a fine figure on a road surface than a case where a part of light emitted from a light source is not shielded.

An aspect of the present disclosure relates to a lighting device for a vehicle. The lighting device includes an irradiator and a shield. The irradiator includes a light source mounted in the vehicle. The shield is provided to face an emission side of band-shaped light from the light source. The irradiator is configured to emit band-shaped light from the light source at a predetermined irradiation angle to irradiate a road surface with the band-shaped light. The irradiator is configured to change an irradiation direction of the band-shaped light toward the road surface. The shield is configured to shield a part of the band-shaped light such that the road surface is illuminated in a shape of a figure indicating prescribed information.

According to the aspect of the present disclosure, the irradiator is configured to emit the band-shaped light from the light source mounted in the vehicle at the predetermined irradiation angle to irradiate the road surface with the band-shaped light, and the irradiator is configured to change the irradiation direction of the band-shaped light toward the road surface. The shield is provided to face the emission side of the band-shaped light from the light source and is configured to shield a part of the band-shaped light such that the road surface is illuminated in the shape of the figure indicating the prescribed information.

With this, since a part of the band-shaped light with which the road surface is irradiated is shielded by the shield, it is possible to irradiate a smaller region with light to illuminate the road surface in the shape of the fine figure than a case where a part of light is not shielded.

In the lighting device according to the aspect of the present disclosure, the shield may have an emission hole that is formed to make a part of the band-shaped light pass and to have a shape similar to the figure in a shield portion shielding a part of the band-shaped light.

According to the aspect of the present disclosure, since it is possible to make a part of the band-shaped light pass with the emission hole in the shield portion, in a case where the shape of the emission hole is formed in the figure indicating the prescribed information, it is possible to draw a fine figure on the road surface.

In the lighting device according to the aspect of the present disclosure, the prescribed information may be character information that attracts attention of a person.

According to the aspect of the present disclosure, since a figure indicating character information is drawn on the road surface, it is possible to present information easy to be visually recognized to a person, such as a pedestrian.

In the lighting device according to the aspect of the present disclosure, the irradiator may include a first light emitter and a second light emitter as the light source. The first light emitter may be configured to emit light for irradiating a first irradiation region on a road surface at a prescribed distance from the vehicle. The second light emitter may be configured to irradiate a second irradiation region on a road surface at a prescribed distance from the vehicle in a direction away from the first irradiation region. The shield may have a first emission hole that is formed to make a part of light emitted from the first light emitter pass, and a second emission hole that is formed to make a part of light emitted from the second light emitter pass. The size of the second emission hole may be smaller than the size of the first emission hole.

According to the aspect of the present disclosure, since it is possible to perform light irradiation toward the road surface with the first light emitter and the first emission hole, and the second light emitter and the second emission hole corresponding to the distance from the vehicle on the road surface, it is possible to irradiate a position on a road surface according to the distance from the vehicle with light having a shape of a figure.

The lighting device according to the aspect of the present disclosure may further include a detector configured to detect a person, and a control device configured to perform control such that, in a case where a person is detected by the detector, the irradiator irradiates a region at a prescribed distance from the detected person with light.

According to the aspect of the present disclosure, in a case where a person is detected by the detector, the control device performs control such that the irradiator irradiates the region at the prescribed distance from the person with light. With this, it is possible to attract attention of a person with light.

As described above, according to the aspect of the present disclosure, it is possible to provide a lighting device for a vehicle capable of irradiating a smaller region with light to draw a fine figure on a road surface than a case where a part of light emitted from a light source is not shielded.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
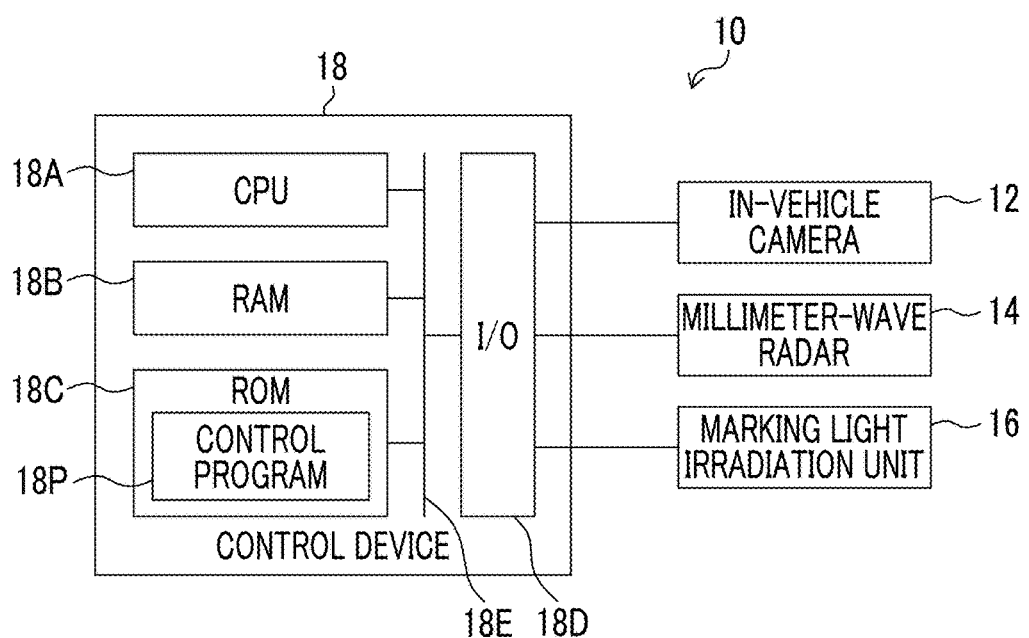
FIG. 1 is a block diagram showing the schematic configuration of a lighting device for a vehicle according to an embodiment.

Hereinafter, an embodiment of the present disclosure will be described in detail referring to the drawings. FIG. 1 is a block diagram showing an example of the schematic configuration of a lighting device for a vehicle according to the embodiment.

In the lighting device 10 for a vehicle according to the embodiment, a marking light irradiation unit 16 as an example of an irradiator is connected to a control device 18, and the marking light irradiation unit 16 is controlled by the control device 18.

The marking light irradiation unit 16 emits band-shaped light to irradiate a road surface with the band-shaped light in order to attract attention of a person, such as a pedestrian. In the embodiment, the marking light irradiation unit 16 attracts attention of a person in a moving direction of the host vehicle to the approach of the vehicle. The color and brightness of light irradiated from the marking light irradiation unit 16 may be the same as the color and brightness of a headlight, or irradiation with light having at least one of a color and brightness different from the headlight may be performed. In a case where light has the same color and brightness as the headlight, it is possible to attract attention of a person in a high beam region in a state in which the headlight is a low beam or a region farther from a region where a high beam in a high beam state reaches.

In the embodiment, an example where the marking light irradiation unit 16 is provided separately from a light source of a headlight is described; however, the same light source as the headlight may be used.

The control device 18 is constituted of a microcomputer including a CPU 18A, a RAM 18B, a ROM 18C, and an I/O 18D, and controls the turn-on and off and irradiation direction of the marking light irradiation unit 16.

The ROM 18C of the control device 18 stores a table for controlling the marking light irradiation unit 16 or a control program 18P that performs irradiation control. The RAM 18B is used as a work memory or the like for various arithmetic operations that are performed by the CPU 18A.

A camera 12 that images in front of the vehicle and a millimeter-wave radar 14 are connected to the I/O 18D, and an imaging result of the camera 12 and a reception result of the millimeter-wave radar 14 are input to the control device 18. The camera 12 and the control device 18 correspond to an example of a detector, and the millimeter-wave radar 14 and the control device 18 correspond to an example of a control device.

The control device 18 detects a person including a pedestrian or an occupant on a bicycle from the imaging result of the camera 12 through image processing, such as image pattern matching.

The control device 18 detects a relative distance and a relative speed of the host vehicle and an obstacle from the reception result of a millimeter wave transmitted from the millimeter-wave radar 14 and reflected from the obstacle including a person.

The control device 18 detects a moving direction of a person, such as a pedestrian, using an image of a person, such as a pedestrian, detected from an image according to the imaging result of the camera 12 and the relative distance and the relative speed of the host vehicle and the obstacle detected using the millimeter-wave radar 14. The moving direction of the person, such as a pedestrian, may be detected from a plurality of images temporally continuous in the imaging result of the camera 12.

In a case where a person, such as a pedestrian, is detected, the control device 18 performs control such that the marking light irradiation unit 16 irradiates a region at a prescribed distance from the person, such as a pedestrian, for example, in front of the person with light. As the prescribed distance, a distance at which a person, such as a pedestrian, easily visually recognizes light projected onto a road surface, and for example, a distance (variable distance) that is the same as the height of the person or a distance (fixed distance) of 1.5 m to 2 m, or the like can be applied. Since an angle of field of a pedestrian is about 70° in a downward direction, it is preferable that a distance or more corresponding to the angle of field of 70° is applied as the prescribed distance. Since light with which the road surface is irradiated is hardly visually recognized even when light is excessively far from the person, such as a pedestrian, it is preferable that light irradiation is performed at a distance at which a person, such as a pedestrian, in a range of several meters from the distance or more corresponding to the angle of field of 70° easily visually recognizes light.

Irradiation of light from the marking light irradiation unit 16 in the lighting device 10 for a vehicle according to the embodiment will be described.

Figure 2:
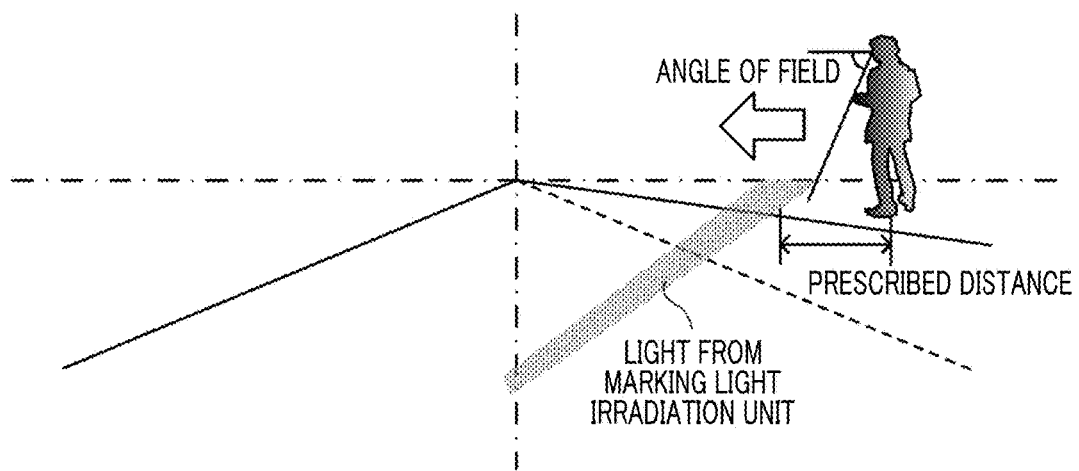
FIG. 2 is an explanatory view of light that is irradiated from a marking light irradiation unit of the lighting device for a vehicle according to the embodiment.
Figure 2:
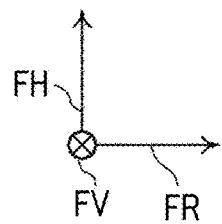

FIG. 2 is a diagram showing an example of a scene in which a pedestrian as an example of a person walks to cross in front of the host vehicle. In FIG. 2, an arrow FH indicates a vehicle height direction, an arrow FV indicates a vehicle moving direction, and an arrow FR indicates a vehicle width direction. As shown in FIG. 2, in a case where a pedestrian is about to cross in front of the host vehicle, light irradiation is performed in front of the pedestrian by the marking light irradiation unit 16, whereby it is possible to attract attention to the approach of the vehicle. Even in a case where a pedestrian is walking along a road, or the like, light irradiation is performed by the marking light irradiation unit 16, whereby it is possible to attract attention and to suppress sudden crossing or the like.

Next, a specific example of the marking light irradiation unit 16 will be described.

Figure 3:
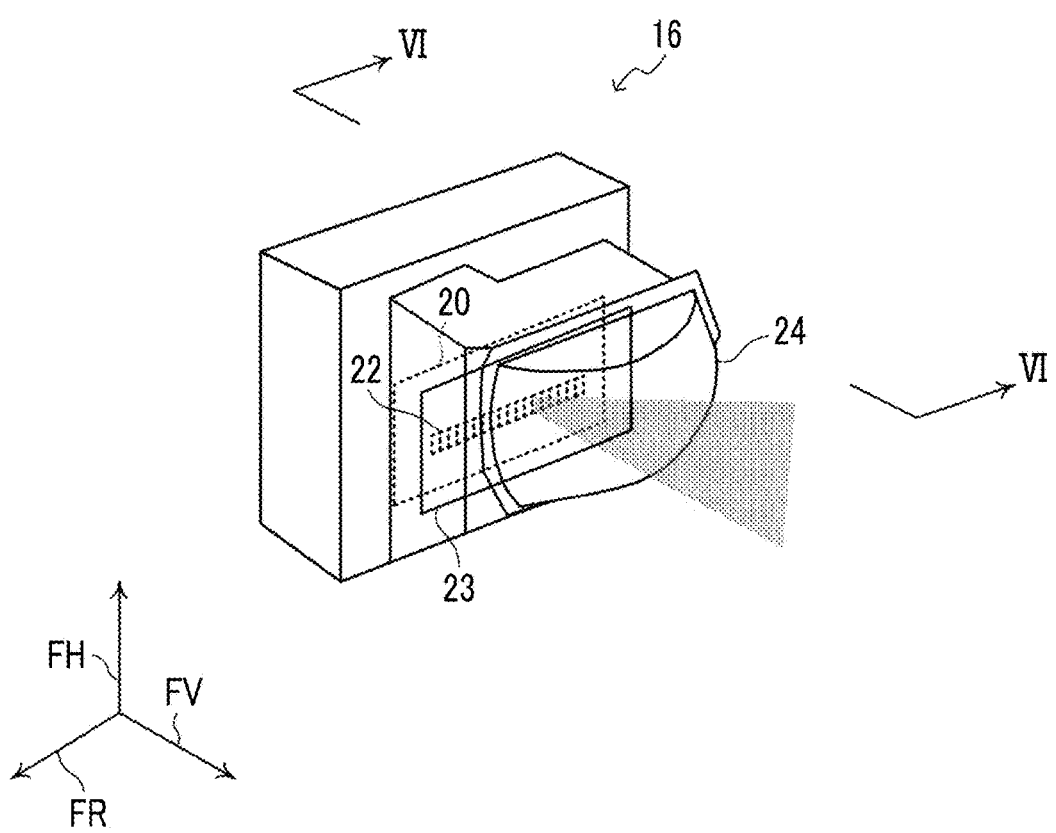
FIG. 3 is a diagram showing an example of an LED array system marking light irradiation unit.

FIG. 3 is a diagram showing an example of an LED array system marking light irradiation unit 16 in which a plurality of LEDs 22 is arrayed.

As shown in FIG. 3, in the LED array system marking light irradiation unit 16, a plurality of LEDs 22 is arrayed on a substrate 20. Each of the LEDs 22 outputs light that is vertically long in a vehicle up-down direction (arrow FH direction and opposite direction). The LEDs 22 may be arrayed in the vehicle up-down direction to output light that is vertically long in the vehicle up-down direction. The LEDs 22 are arrayed in the vehicle width direction (arrow FR direction and opposite direction) of the vehicle. A lens 24 is provided on the emission side of light of the LEDs 22, and irradiation of light from the LEDs 22 is performed in front of the vehicle through the lens 24. In the LED array system marking light irradiation unit 16, one or a plurality of LEDs among the LEDs 22 is selectively turned on, whereby it is possible to perform irradiation with band-shaped light in an arbitrary direction in front of the vehicle. That is, the control device 18 turns on a plurality of LEDs 22 corresponding to a region at a prescribed distance from the detected person, such as a pedestrian, whereby it is possible to irradiate a road surface in the region at the prescribed distance from the person, such as a pedestrian, with the band-shaped light.

On the other hand, in a case where a region at a prescribed distance from a person, for example, a region in front of a pedestrian is irradiated with light by the marking light irradiation unit 16, irradiation of narrower linear light is performed, whereby a degree that a person, such as a pedestrian, recognizes light irradiated from the marking light irradiation unit 16 is improved.

Accordingly, the marking light irradiation unit 16 according to the embodiment irradiates a road surface with linear light that is formed by shielding a part of the band-shaped light emitted from the LEDs 22.

Figure 4:
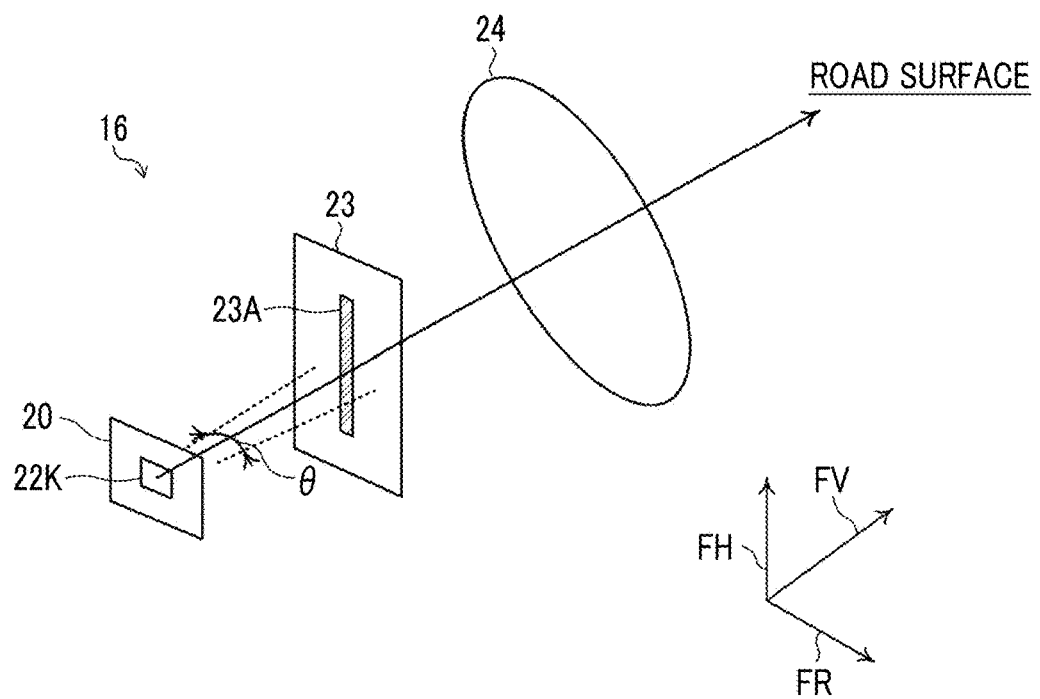
FIG. 4 is a schematic view showing an example of the marking light irradiation unit.
Figure 5:
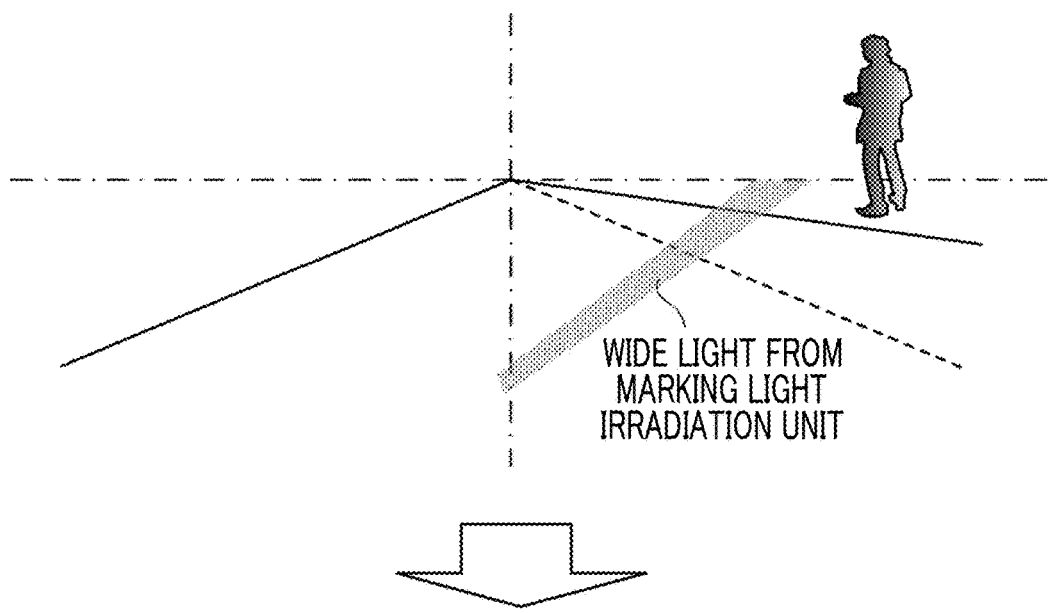
FIG. 5 is an explanatory view of light irradiated from the marking light irradiation unit.
Figure 5:
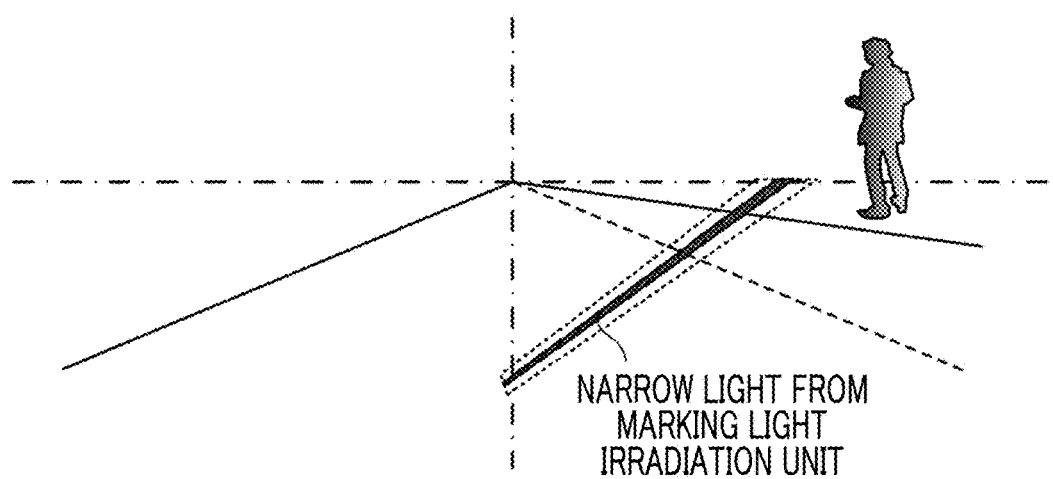

FIG. 4 is a diagram schematically showing an example of the marking light irradiation unit 16 according to the embodiment. In FIG. 4, for simplification of description, one LED 22K among the LEDs 22 arrayed on the substrate 20 is schematically shown. As shown in FIG. 4, in the marking light irradiation unit 16, the road surface is irradiated with light emitted from one LED 22K and transmitted through the lens 24. Light emitted from the LED 22K has a spread in the vehicle width direction at an emission angle θ determined in the LED 22K. The road surface is irradiated with light spread at the emission angle θ, whereby the width of the band-shaped light with which the road surface is irradiated spreads. In order to suppress the spread, in the marking light irradiation unit 16 according to the embodiment, a slit plate 23 as a shield that shields a part of light emitted from the LED 22K is provided on an emission side of the LED 22K. The slit plate 23 has an elongated rectangular emission hole 23A that extends in the vehicle up-down direction to make light emitted from the LED 22K pass. With this, as shown in FIG. 5, in the marking light irradiation unit 16, light emitted from the LED 22K becomes solely light passing through the emission hole 23A with the slit plate 23, and irradiation with narrow linear light according to the size of the emission hole 23A can be performed.

The emission hole 23A in the slit plate 23 is not limited to a rectangular shape having a narrow slit width, and micromachining for forming a plurality of fine emission holes or forming an emission hole in a circular shape or a polygonal shape is possible. A plurality of fine emission holes is machined, whereby it is possible to make the shape of light passing through the emission hole 23A of the slit plate 23 be a shape of a predetermined figure or the like. For this reason, the emission hole 23A in the slit plate 23 is formed in a shape indicating information, such as a character, for attracting attention of a person, such as a pedestrian, whereby it is possible to present information for attracting attention of a person with light irradiation of the marking light irradiation unit 16.

In regard to light irradiated from the marking light irradiation unit 16, while irradiation with linear light in an arbitrary direction is performed by selectively turning on the LEDs 22, a position on the road surface irradiated with the linear light corresponds to a position on the slit plate 23. That is, the position of the emission hole 23A in the slit plate 23 corresponds to the position on the road surface irradiated with light. For this reason, the emission holes 23A are provided at a plurality of arbitrary positions on the slit plate 23, whereby it is possible to irradiate a position on the road surface corresponding to each of the positions of the emission holes 23A with light according to the shape of the corresponding emission hole 23A to present information in a figure according to the shape of the corresponding emission hole 23A.

Figure 6:
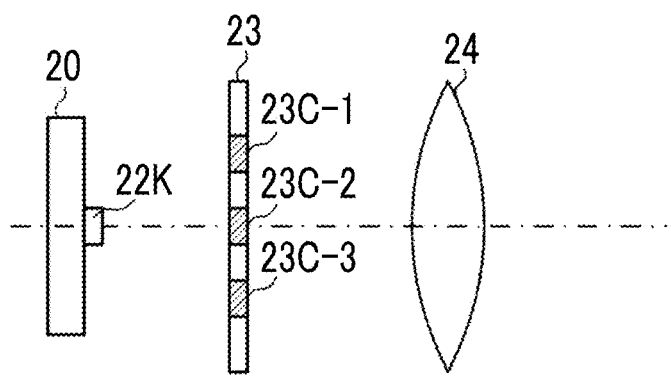
FIG. 6 is a schematic view showing an example of the marking light irradiation unit.
Figure 6:
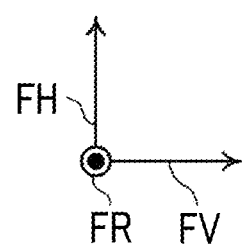

FIG. 6 is a diagram schematically showing an example of a marking light irradiation unit 16 that includes a slit plate 23 with three figure holes 23C-1, 23C-2, 23C-3 as emission holes 23A corresponding to three positions on a road surface. FIG. 6 corresponds to a cross-section taken along the line VI-VI in FIG. 3. In the example shown in FIG. 6, the road surface is irradiated with light passing through the three figure holes 23C-1, 23C-2, 23C-3 by a single LED 22K, that is, the three positions on the road surface are irradiated with light by the single LED 22K.

Figure 7:
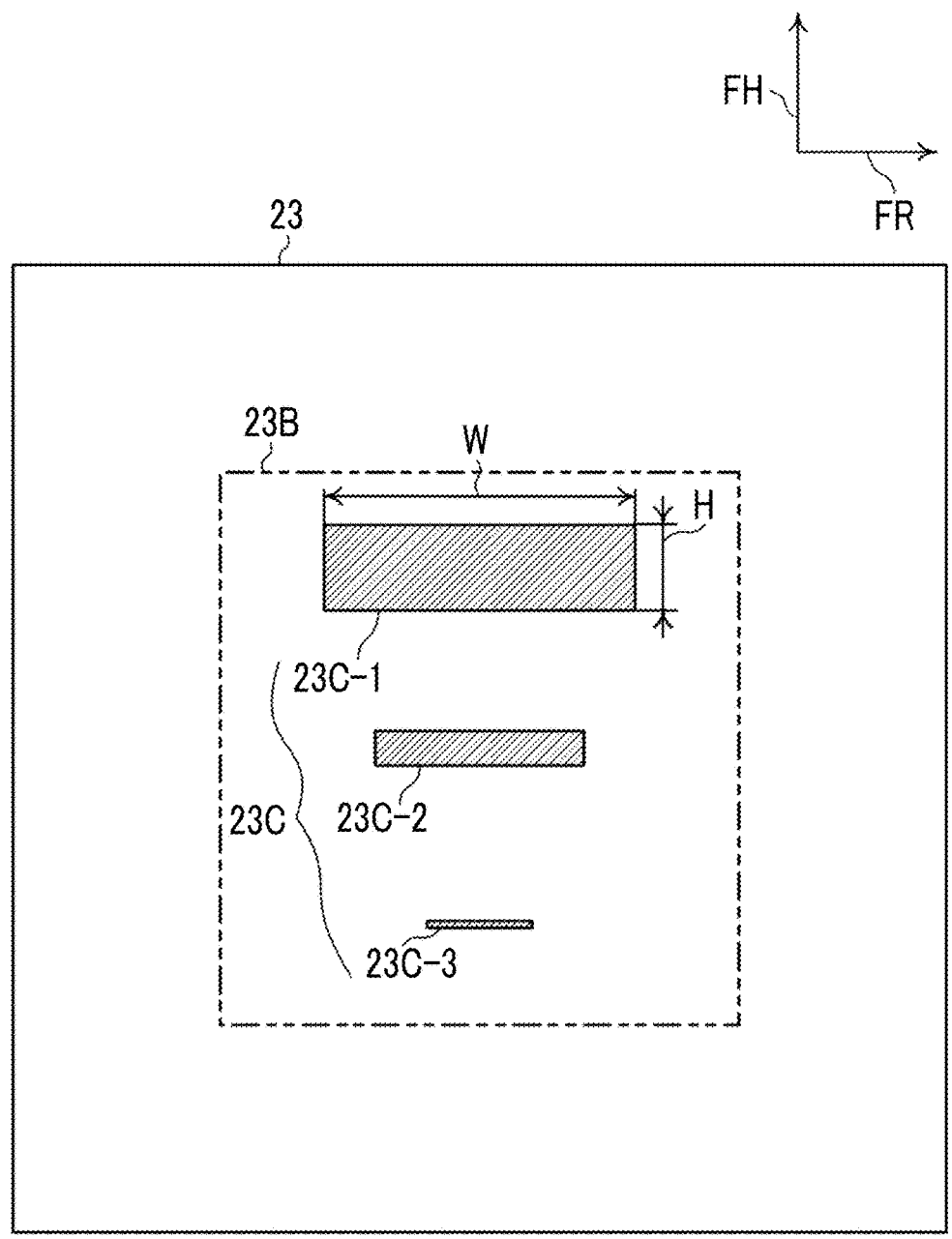
FIG. 7 is an image diagram showing an example of a slit plate that is presentable information in a figure.

FIG. 7 is a diagram showing an example of a slit plate 23 that is presentable information in a figure. The slit plate 23 shown in FIG. 7 is provided with a micromachining region 23B as an emission hole. In the micromachining region 23B, figure holes 23C are provided at a plurality of positions corresponding to the distance between the host vehicle and a position on the road surface that is irradiated with irradiation light of the marking light irradiation unit 16. In the example shown in FIG. 6, figure holes 23C-1, 23C-2, 23C-3 having a size of a width W and a height H are provided in the vehicle up-down direction corresponding to positions on the road surface at 20 m, 40 m, and 67 m from the host vehicle. Information for attracting attention of a person, such as a pedestrian, is machined in each of the figure holes 23C-1, 23C-2, 23C-3 with light irradiation. As an example of information for attracting attention of a person, such as a pedestrian, there is character information of "STOP", and a large number of slits (emission holes) are formed in a character portion and are machined such that the character "STOP" is drawn on the road surface.

Figure 8C:
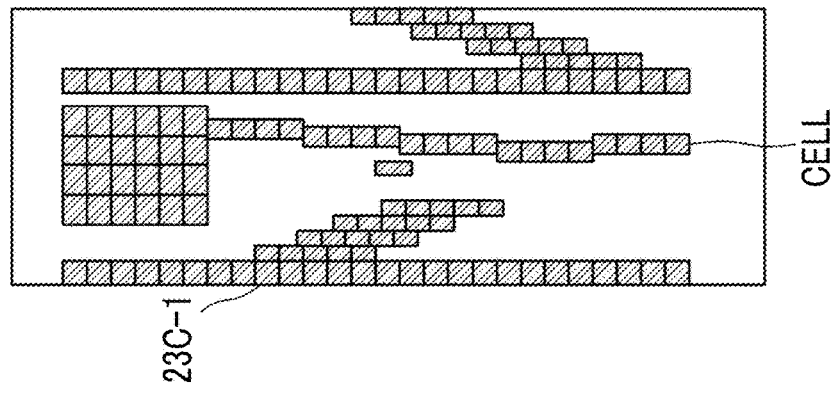
FIG. 8C is an image diagram showing an example of a micromachining region where an emission hole is machined with a large number of slits.
Figure 8B:
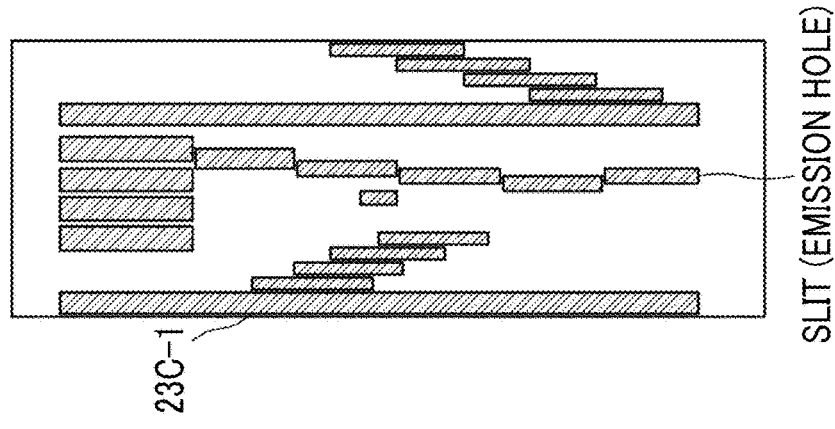
FIG. 8B is an image diagram showing an example of a micromachining region where an emission hole is machined with a large number of slits.
Figure 8A:
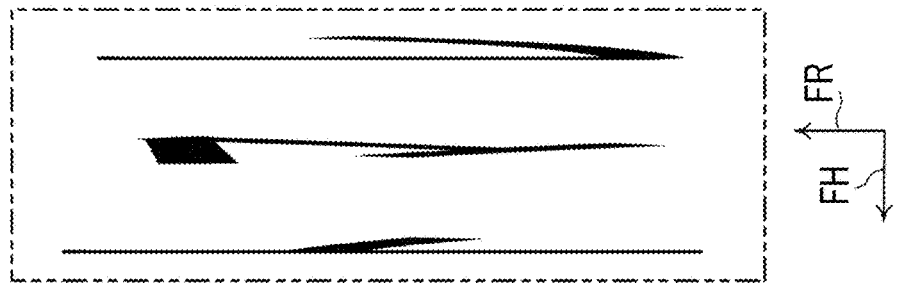
FIG. 8A is an image diagram showing an example of a micromachining region where an emission hole is machined with a large number of slits.

FIGS. 8A, 8B, and 8C are diagrams showing an example of the micromachining region 23B where information for attracting attention of a person, such as a pedestrian, is machined with a large number of slits (emission holes). FIGS. 8A, 8B, and 8C show a state in which character information of "STOP" is machined within a range of a figure hole 23C-1. FIG. 8A schematically shows machining the character information of "STOP" within the range of the figure hole 23C-1. FIG. 8B shows a figure hole 23C-1 machined by forming a large number of slits (emission holes) such that light corresponding to the character "STOP" passes therethrough. FIG. 8C shows a figure hole 23C-1 machined by combining cells with a fine slit within the range of the figure hole 23C-1 such that light corresponding to the character "STOP" passes therethrough.

Since a figure is drawn on a road surface with oblique irradiation of light from the marking light irradiation unit 16, it is preferable that the figure hole 23C is formed while determining a size and an aspect ratio of a figure according to a magnification corresponding to a drawing position on the road surface. An example of a figure hole in a case of drawing a figure in a quadrangular region having each side of 1 m corresponding to a drawing position on the road surface is shown in the following table.

TABLE 1

| Position (m) | W (μm) | H (μm) | Aspect Ratio |
|---|---|---|---|
| 20 | 2572 | 90 | 28 |
| 40 | 1317 | 23 | 57 |
| 67 | 794 | 8.3 | 96 |

An example where the figure holes 23C-1, 23C-2, 23C-3 are provided in the slit plate 23 in order from an upper side in the vehicle up-down direction with a size (width W and height H) corresponding to the positions on the road surface at 20 m, 40 m, and 67 m from the host vehicle has been described. The reason that the figure holes are provided in order as described above is because light passing through a lower side in the vehicle up-down direction of the slit plate 23 is emitted upward with the refraction of the lens 24, light passing through the upper side in the vehicle up-down direction is emitted downward, and an image is reversed. Table 1 shows an example of a shape ratio (aspect ratio) of a character set assuming that light is irradiated obliquely in a case where a character image is employed as a figure drawn on a road surface. That is, for example, in a case of drawing a character in a quadrangular region having each side of 1 m at a position on a road surface at 20 m in front of the vehicle, light emitted from the slit plate 23 has a spread of 2.8 degrees in the vehicle width direction and 0.1 degrees in the vehicle moving direction. For this reason, a shape ratio (aspect ratio) of a character is determined assuming that light spreads at 2.8 degrees in the vehicle width direction and at 0.1 degrees in the vehicle moving direction.

Figure 9:
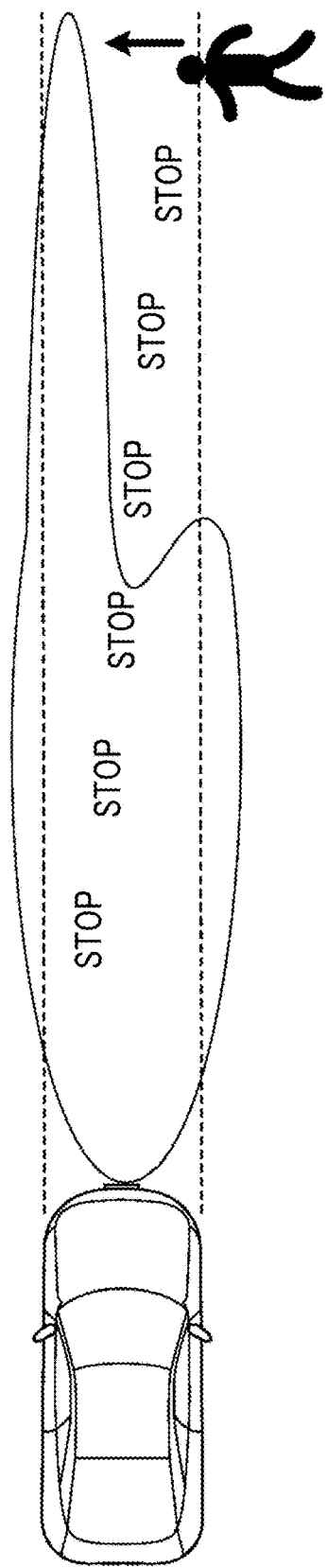
FIG. 9 is an image diagram showing an example of a scene in which information is presented to a pedestrian with light from the marking light irradiation unit.

FIG. 9 is a diagram showing an example of a scene in which information is presented to a pedestrian with light from the marking light irradiation unit 16. In the example shown in FIG. 9, a scene in which, with a marking light irradiation unit 16 including a slit plate 23 provided with figure holes machined such that light corresponding to the character "STOP" passes through six positions corresponding to six types of distances, a figure "STOP" is drawn at the six positions. As shown in the FIG. 9, the pedestrian visually recognizes the characters "STOP" drawn on the road surface, thereby suppressing an action, such as sudden crossing.

Figure 10:
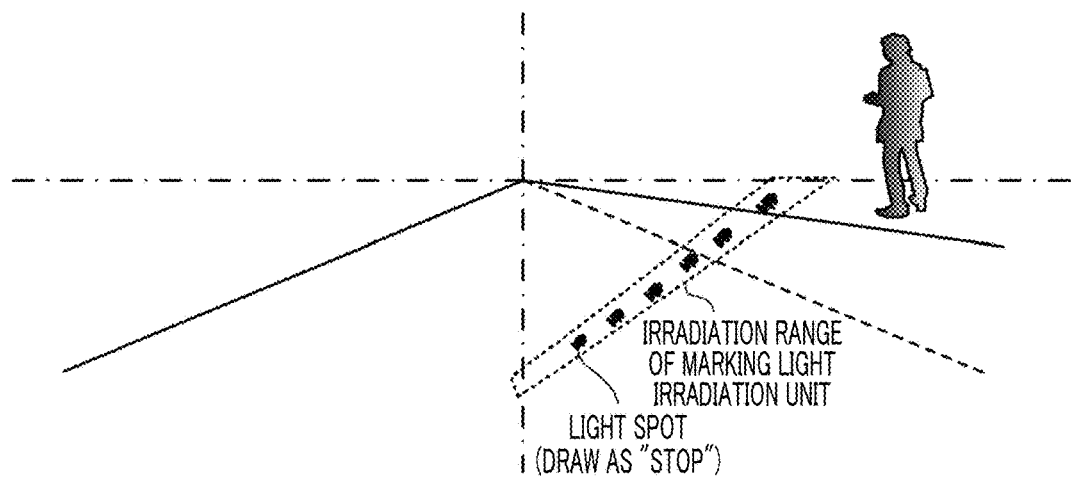
FIG. 10 is an image diagram showing an example of a scene that a driver of a host vehicle views.

FIG. 10 is a diagram showing an example of a scene that a driver of the host vehicle views in a case of presenting information to a pedestrian with light from the marking light irradiation unit 16. As shown in FIG. 10, since the driver of the host vehicle views the road surface with relatively low accuracy, the interval of rays of light representing the character is relatively narrowed, and light is visually recognized such that light irradiation toward the pedestrian is performed in a state where the characters "STOP" collapses. With this, simple information presentation with light irradiation toward the pedestrian is performed to the driver of the host vehicle, and the driver of the host vehicle does not feed burdened.

In the example shown in FIG. 6, the three positions on the road surface are irradiated with light by the single LED 22K. In this case, it is possible to perform irradiation with light effective for a pedestrian, that is, to irradiate a position effective for presenting information to the pedestrian with light from the marking light irradiation unit 16. In order to irradiate the position effective for presenting information to the pedestrian with light, a desirable position on the road surface may be irradiated with light from the marking light irradiation unit 16.

Next, an example of a case where irradiation with light effective for a pedestrian is performed by the marking light irradiation unit 16 will be described.

Figure 11:
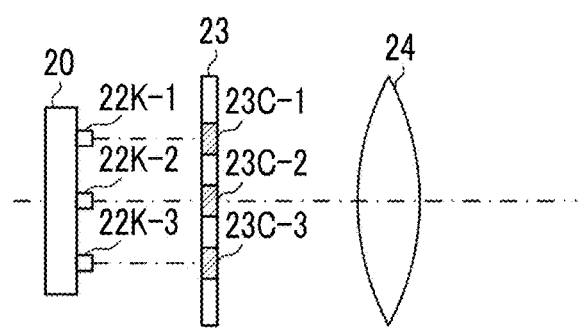
FIG. 11 is a schematic view showing an example of the marking light irradiation unit.
Figure 11:
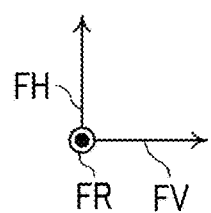

FIG. 11 is a diagram schematically showing an example of the marking light irradiation unit 16 that can perform irradiation with light effective for a pedestrian. In the example shown in FIG. 11, the road surface can be irradiated with light passing through three figure holes 23C-1, 23C-2, 23C-3 by three LEDs 22K-1, 22K-2, 22K-3 corresponding to three positions on the road surface. That is, the three LEDs 22K-1, 22K-2, 22K-3 correspond to the three figure holes 23C-1, 23C-2, 23C-3, and the three positions on the road surface can be irradiated independently with light.

Although a case where the LED array system marking light irradiation unit 16 in which the LEDs are arrayed has been described above, a marking light irradiation unit is not limited to the LED array system in which the LEDs are arrayed. Next, an example of the marking light irradiation unit 16 according to the embodiment will be described.

Figure 12:
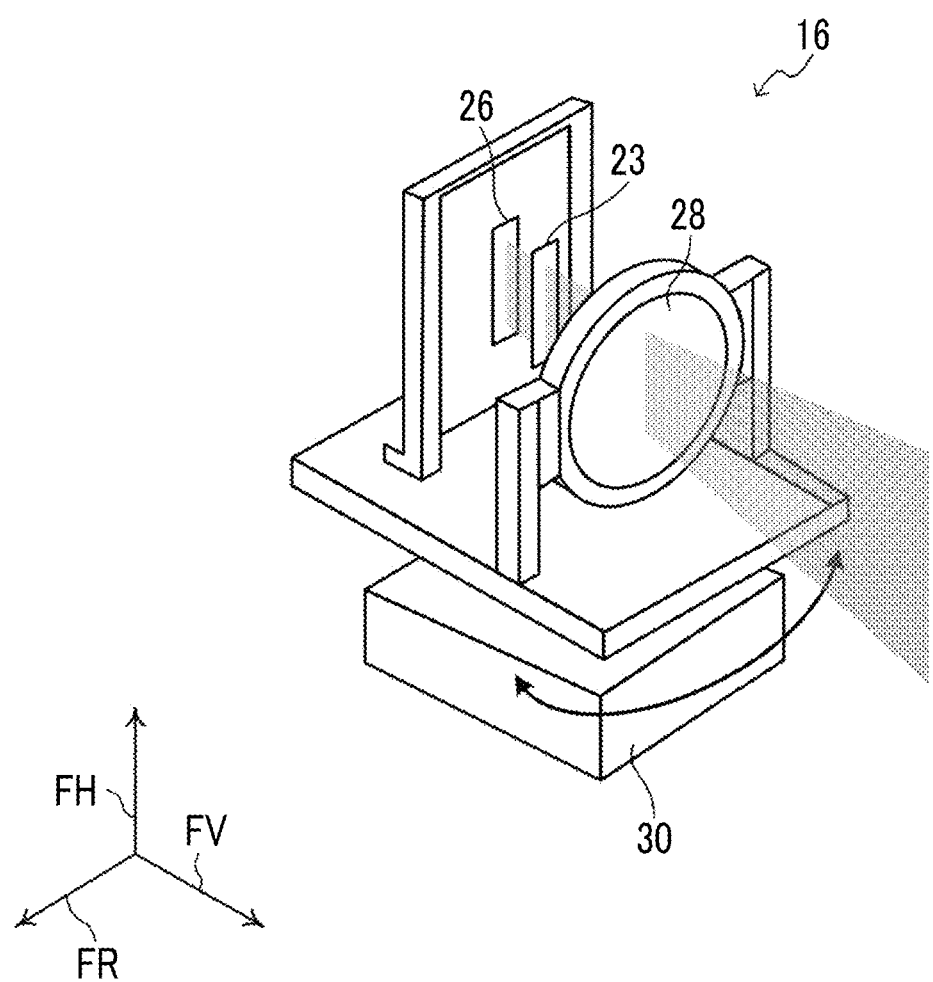
FIG. 12 is an image diagram showing an example of a light source rotating system marking light irradiation unit.

FIG. 12 is a diagram showing an example of a light source rotating system marking light irradiation unit 16.

The light source rotating system shown in FIG. 12 includes various light sources 26, such as an LED, a lens 28 provided on a light irradiation side of the light source 26, and a swivel actuator 30 that rotates the light source 26 and the lens 28 in the vehicle width direction. The light source 26 outputs light that is vertically long in the vehicle up-down direction, or light sources 26, such as LEDs, are also arrayed in the vehicle up-down direction to output light that is vertically long in the vehicle up-down direction. The lens 28 is provided in a light irradiation direction of the light source 26, and irradiation with light from the light source 26 through the lens 28 is performed in front of the vehicle. In order to output light that is vertically long in the vehicle up-down direction, light irradiated from the light source 26 may be converted to light that is vertically long in the vehicle up-down direction with the lens 28 and vertically long light may be output. In the above-described system, the light source 26 is turned on to perform irradiation with linear light, and the swivel actuator 30 is driven, thereby moving the irradiation direction of linear light from the vehicle up-down direction to the vehicle width direction. That is, the control device 18 controls the swivel actuator 30 such that a position corresponding to a region at a prescribed distance from a detected person is irradiated with linear light, whereby it is possible to irradiate a region at a prescribed distance from a person with linear light.

A slit plate 23 that shields a part of light emitted from the light source 26 may be provided between the light source 26 and the lens 28.

Figure 13:
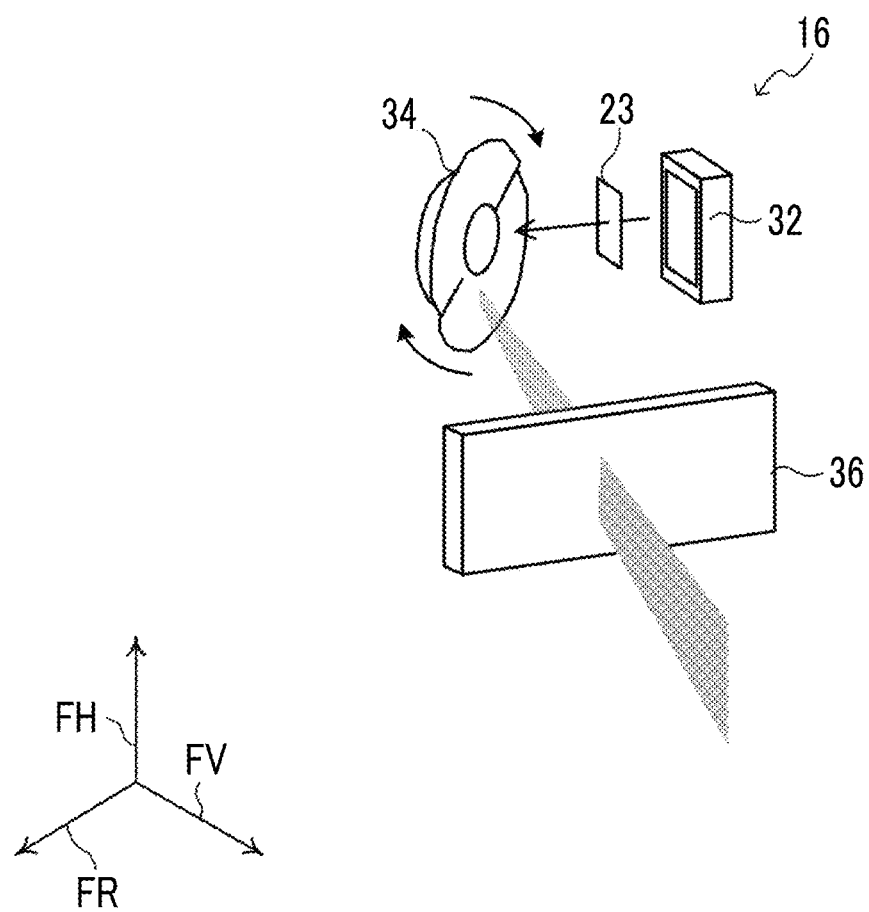
FIG. 13 is an image diagram showing an example of a blade scan system marking light irradiation unit.

FIG. 13 is a diagram showing an example of a blade scan system marking light irradiation unit 16 in which a rotating mirror is rotated.

The blade scan system marking light irradiation unit 16 of FIG. 13 includes a light source 32, such as an LED, a rotating mirror 34, and a lens 36. The light source 32 outputs light that is vertically long in the vehicle up-down direction, or light sources 32, such as an LED, are also arrayed in the vehicle up-down direction to output light that is vertically long in the vehicle up-down direction. The rotating mirror 34 and the lens 36 are provided in a light irradiation direction of the light source 32. Light irradiated from the light source 32 is reflected from the rotating mirror 34 and irradiation with linear light is performed in front of the vehicle through the lens 36. A reflection direction can be changed to the vehicle width direction by rotating the rotating mirror 34. In the above-described system, for example, a technique described in Japanese Unexamined Patent Application Publication No. 2016-074235 (JP 2016-074235 A) is applied, and the light source 32 is turned on while rotating the rotating mirror 34 at a high speed, whereby it is possible to perform irradiation with linear light in front of the vehicle. The light source 32 is turned on in synchronization with the position of the rotating mirror 34 that reflects light toward a region at a prescribed distance from a person, instead of continuously turning on the light source 32, whereby it is possible to irradiate a region at a prescribed distance from a person with linear light. That is, the control device 18 controls the turn-on of the light source 32 such that the light source 32 is turned on in synchronization with the position of the rotating mirror 34 corresponding to a region at a prescribed distance from a detected person, whereby it is possible to irradiate a road surface in the region at a prescribed distance from a person with linear light. Alternatively, the rotating mirror 34 may be rotated such that linear light is reflected and a region at a prescribed distance from a detected person is irradiated with linear light, and the light source 32 may be turned on in a state in which the rotating mirror 34 is stopped.

A slit plate 23 that shields a part of light emitted from the light source 32 may be provided between the light source 32 and the rotating mirror 34.

In the blade scan system marking light irradiation unit 16 of FIG. 13, a headlight and a light source are usable in common. However, in the blade scan system of FIG. 13, a light source for a high beam, a light source for a low beam, and a light source for marking light are provided and are usable in common with a headlight.

Figure 14:
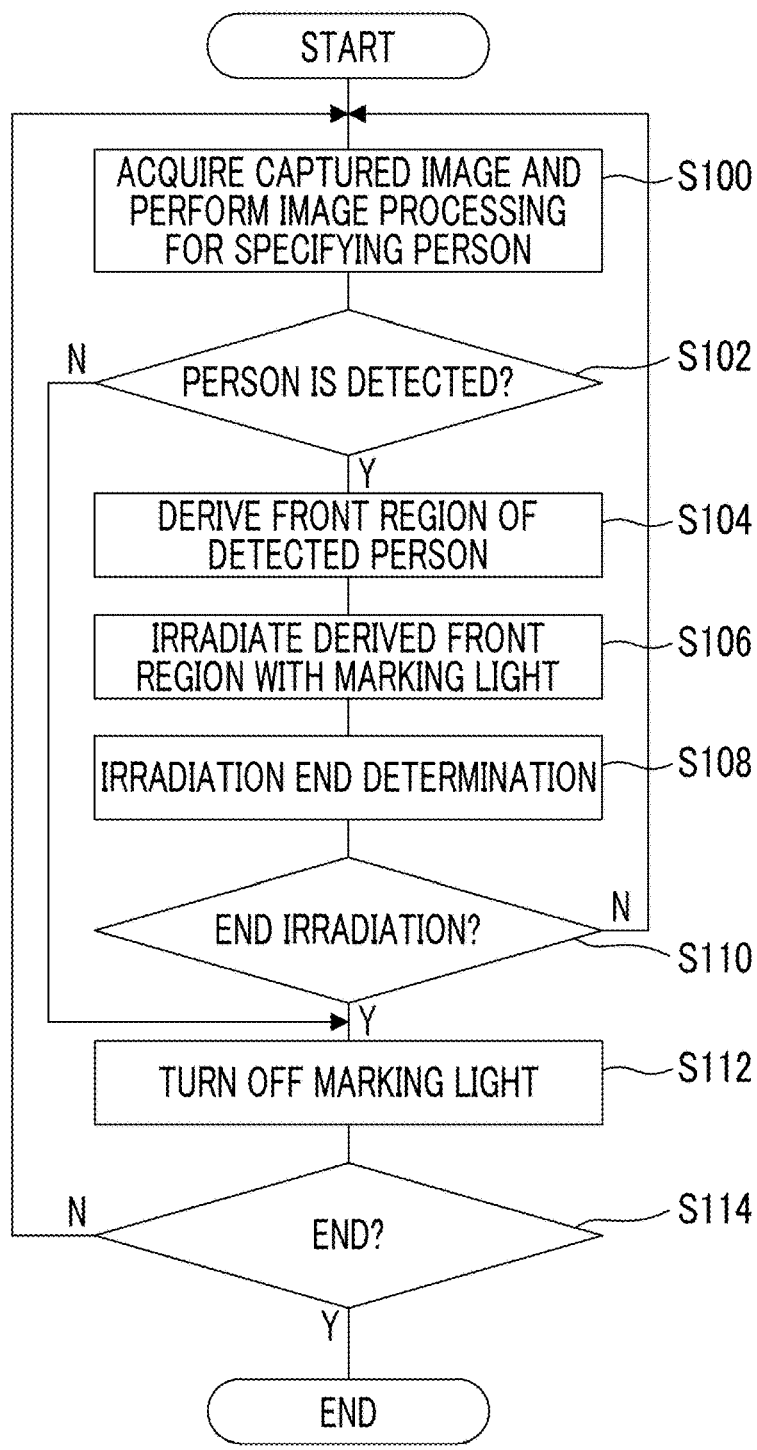
FIG. 14 is a flowchart showing an example of a flow of processing that is performed by a control device of the lighting device for a vehicle according to the embodiment.

Next, specific processing that is performed by the control device 18 of the lighting device 10 for a vehicle according to the embodiment will be described. FIG. 14 is a flowchart showing an example of a flow of processing that is performed by the control device 18 of the lighting device 10 for a vehicle according to the embodiment. The processing of FIG. 14 starts in a case where an ignition switch (not shown) is turned on. The processing of FIG. 14 may start in a case where a switch (not shown) that gives an instruction to perform processing for presenting information with irradiation of light from the marking light irradiation unit 16 is turned on.

In Step S100, the CPU 18A acquires a captured image of the camera 12 and starts detection of a person from the captured image. In detail, detection of a person starts from the captured image using various image processing techniques, such as pattern matching.

Next, in Step S102, the CPU 18A determines whether or not a person is detected. In a case where a person is detected and the determination of the CPU 18A in Step S102 is affirmative, the process progresses to Step S104, and in a case where the determination is negative, the process progresses to Step S112.

In Step S104, the CPU 18A derives a front region of the person detected in Step S100. In Step S104, a moving direction of the person is detected using a position of the person detected from the captured image of the camera 12 and a relative distance and a relative speed of the host vehicle and an obstacle detected based on a reception signal millimeter-wave radar 14. The moving direction of the person may be detected from position variation of a detected person with captured images temporally continuous temporally captured by the camera 12.

Next, in Step S106, the CPU 18A controls the marking light irradiation unit 16 such that the front region of the person derived in Step S104 is irradiated with light from the marking light irradiation unit 16. With this, a region at a prescribed distance from the detected person is irradiated with light. A part of light emitted from the LEDs 22 is shielded by at least the slit plate 23, and irradiated light becomes light easier to be recognized to a person, such as a pedestrian. Therefore, a person, such as a pedestrian, easily notices light, and it is possible to effectively attract attention of a person, such as a pedestrian.

Performing irradiation of light from the marking light irradiation unit 16 is not limited to irradiating a region at a prescribed distance in front of a person with light. For example, a region at a prescribed distance on a road center side in the vehicle width direction from a person may be irradiated with light. Irradiation with marking light in front of a person is performed, whereby the irradiated person easily notices marking light. The region at the prescribed distance on the road center side in the vehicle width direction from the person is irradiated with light, whereby it is possible to attract attention to crossing of a road.

Next, in Step S108, the CPU 18A determines whether or not to end irradiation of light from the marking light irradiation unit 16. As an example of the end determination that is performed in Step S108, determination is made whether or not irradiation of light from the marking light irradiation unit 16 elapses a prescribed predetermined time. As another example of the end determination, determination is made whether or not a target person, such as a pedestrian, is at a prescribed distance from the host vehicle.

Next, in Step S110, the CPU 18A determines whether or not to end irradiation of light from the marking light irradiation unit 16 based on a determination result in Step S108. In a case where the determination in Step S110 is affirmative, the process progresses to Step S112, irradiation of light from the marking light irradiation unit 16 ends, and then, the process progresses to Step S114. In a case where the determination in Step S110 is negative, the process returns to Step S100, and the above-described processing is repeated.

In Step S114, the CPU 18A determines whether or not to end information presentation processing for performing irradiation of light from the marking light irradiation unit 16. The end determination of the information presentation processing is affirmative, for example, in a case where the ignition switch (not shown) is turned off or in a case where the switch (not shown) that gives an instruction to perform the information presentation processing is turned off. In a case where the determination in Step S114 is affirmative, the processing routine shown in FIG. 14 ends. In a case where the determination in Step S114 is negative, the process returns to Step S100, and the above-described processing is repeated.

In this way, in the embodiment, in a case where a person is detected, since a region at a prescribed distance from the detected person is irradiated with region-limited light, it is possible to perform irradiation of light more easily noticeable by a person, such as a pedestrian, compared to a case where irradiation of unlimited light from the marking light irradiation unit 16 is performed. Irradiation of light more easily noticeable by a person, such as a pedestrian, is performed, whereby it is possible to effectively attract attention to the approach of the vehicle.

In the embodiment, an example where the relative distance and the relative speed of the host vehicle and an obstacle, such as a person, are detected by the camera 12 and the millimeter-wave radar 14 has been described; however, applicable embodiment of the present disclosure is not limited to a configuration in which the camera 12 and the millimeter-wave radar 14 are used. That is, various existing devices can be used as long as the devices can detect related information, such as the relative distance and the relative speed of the host vehicle and the obstacles, such as a person. For example, the relative distance and the relative speed of the host vehicle and the obstacle may be detected using a stereo camera, without using a millimeter-wave radar.

The processing shown in FIG. 14 that is performed by the control device 18 of the lighting device 10 for a vehicle in the embodiment has been described as software processing that is performed by executing a program, but may be processing that is performed by hardware. Alternatively, the processing may be processing that is performed by a combination of both of software and hardware. The program that is stored in the ROM may be distributed in the form of being stored in various storage mediums.

Although the present disclosure has been described in connection with the embodiment, the technical scope of the present disclosure is not limited to the scope described in the embodiment. Various alterations and improvements can be added to the embodiment without departing from the spirit of the present disclosure, and the forms added with such alterations or improvements are also included in the technical scope of the present disclosure.

What is claimed is:

1. A lighting device for a vehicle, the lighting device comprising:
   an irradiator that includes a light source mounted in the vehicle, the irradiator being configured to emit band-shaped light from the light source at a predetermined irradiation angle to irradiate a road surface with the band-shaped light, and the irradiator being configured to change an irradiation direction of the band-shaped light toward the road surface;
   a detector configured to detect a pedestrian; and
   a shield that is provided to face an emission side of the band-shaped light from the light source, the shield being configured to shield a part of the band-shaped light such that the road surface is illuminated in a shape of a figure indicating prescribed information in an orientation configured to be read by the detected pedestrian.

2. The lighting device according to claim 1, wherein the shield has an emission hole that is formed to make a part of the band-shaped light pass and to have a shape similar to the figure in a shield portion shielding a part of the band-shaped light.

3. The lighting device according to claim 2, wherein the prescribed information is character information that attracts attention of the detected pedestrian.

4. The lighting device according to claim 2, wherein:
   the irradiator includes a first light emitter and a second light emitter as the light source;
   the first light emitter is configured to emit light for irradiating a first irradiation region on a road surface at a prescribed distance from the vehicle;
   the second light emitter is configured to irradiate a second irradiation region on a road surface at a prescribed distance from the vehicle in a direction away from the first irradiation region; and
   the shield has a first emission hole that is formed to make a part of light emitted from the first light emitter pass, and a second emission hole that is formed to make a part of light emitted from the second light emitter pass, a size of the second emission hole being smaller than a size of the first emission hole.

5. The lighting device according to claim 1, further comprising:
   a control device configured to perform control such that, in a case where the pedestrian is detected by the detector, the irradiator irradiates a region at a prescribed distance from the detected pedestrian with light.

6. The lighting device according to claim 1, wherein the figure is projected at a position 70 degrees or less downward from an estimated eye level of the detected pedestrian.

* * * * *